United States Patent

Cain et al.

[15] 3,689,513
[45] Sept. 5, 1972

[54] INHIBITORS OF OXIDATIVE DEGRADATION

[72] Inventors: Maurice Edward Cain, Welwyn Garden City; Brian Saville, Welwyn; Geoffrey Thomas Knight, Shefford, all of England

[73] Assignee: The Natural Rubber Producers' Research Association, London, W.C. 2, England

[22] Filed: July 14, 1969

[21] Appl. No.: 841,610

[30] Foreign Application Priority Data

July 23, 1968    Great Britain..........35,194/68

[52] U.S. Cl. ..............260/404.5, 252/401, 252/403, 260/240 R, 260/574, 260/577, 260/619, 260/689, 260/800, 260/809
[51] Int. Cl. .........................C07c 87/50, C07c 95/08
[58] Field of Search...........260/240 G, 574, 577, 143

[56] References Cited

UNITED STATES PATENTS

| | | |
|---|---|---|
| 3,107,265 | 10/1963 | DeButts et al.............260/143 |
| 2,846,473 | 8/1958 | Beaver et al...........260/574 X |
| 2,941,921 | 6/1960 | Darlington.................424/330 |
| 3,445,531 | 5/1969 | Anderson..............260/577 X |

OTHER PUBLICATIONS

Hamer et al., Tetrahedron Letters No. 6, pages 381 to 384 (1963).
Karrer, Organic Chemistry, 4th English Ed., page 928, Elsevier Publ. Co., New York 1950.
Chemical Abstracts I, Vol. 52, Col. 11182 (1958) (abstract of Endo).
Chemical Abstracts II, Vol. 56, Col. 5887 (1962) (abstract of Ger. 1,104,522).
Misra et al., J. Ind. Chem. Soc. Vol. 37, pages 481–482 (1960).
Lattes et al., Comptes Rendus, Vol. 265, series C, pages 341 to 344 (Aug. 1967).
Houben–Weyl, Methoden der Organischen Chemie, Band X/4, (4th Ed.), pages 364 and 406– 407, Georg Thieme Verlag, Stuttgart, Germany (March 1968).

*Primary Examiner*—John D. Randolph
*Attorney*—Wenderoth, Lind & Ponack

[57] ABSTRACT

Novel secondary aromatic-aliphatic amines having anti-oxidant properties are prepared by reacting aromatic nitroso amines or phenols with olefins having at least one hydrogen atom attached to a carbon atom which is in the $\alpha$-position with respect to a carbon-carbon double bond. The reaction may be performed by heating the reactants together under an inert atmosphere in the presence of a polar or non-polar organic solvent, or using the olefin as a solvent.

10 Claims, No Drawings

INHIBITORS OF OXIDATIVE DEGRADATION

This invention relates to inhibitors of oxidative degradation, and in particular to certain novel secondary aromatic-aliphatic amines, and to a process for their preparation.

The conventional preparation of p-phenylenediamines involves the catalytic hydrogenation of a mixture of a p-amine, p-nitro or p-nitroso-aniline and an aldehyde or ketone. A disadvantage of this hydrogenation reaction is that it is only suitable for batch operation. A further disadvantage is that suitable ketones or aldehydes may be expensive or not readily obtainable. By contrast, the thermal addition reaction of the present invention is capable, in principle, of being operated continuously. Also, it may be desirable to prepare antioxidants of high molecular weights in order to minimize their removal from the system which they are protecting by volatilization, migration or solvent action; according to the present invention, paraphenylenediamine groups can advantageously be introduced into large molecules by the use of cheap and readily available unsaturated fats and oils.

The present invention provides a process for preparing a secondary aromatic-aliphatic amine, which process comprises heating together a) an aromatic nitroso compound having the formula:

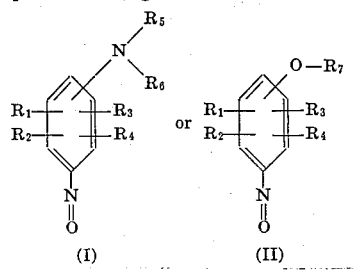

where $R_1$, $R_2$, $R_3$ and $R_4$ may be the same or different and each represent a hydrogen atom, a saturated or unsaturated aliphatic (including alicyclic) group or an aryl, aralkyl or alkaryl group, which may contain one or more non-carbon atoms, or may, in the case of formula (I) form one or more additional aromatic rings fused to the aromatic ring shown in the formula, $R_5$, $R_6$ and $R_7$ may be the same or different and each represent a hydrogen atom, a saturated or unsaturated aliphatic (including alicyclic) group, or an aryl, aralkyl or alkaryl group which may contain one or more non-carbon atoms, or $R_5$ and $R_6$ together with the nitrogen atom to which they are attached form a heterocyclic ring which may contain one or more other hetero atoms, and b) an olefin having at least one hydrogen atom attached to a carbon atom which is in the $\alpha$-position with respect to the carbon-carbon double bond, i.e., having the formula:

$$RRC = CR - CHRR \quad (III)$$

where R in each case is a hydrogen atom or a saturated or unsaturated aliphatic (including alicyclic) group or an aryl, aralkyl or alkaryl group which may contain one or more other functional groups, provided that each group R contains not more than 100 carbon atoms.

It should be noted that large substituent groups, attached to the aromatic ring of the nitroso compound, may have the effect of sterically blocking either the nitroso group or the other functional group (e.g. amine or hydroxyl) so as to inhibit or prevent reaction. For example, it has been found that di-tertiarybutyl nitrosophenol cannot easily be reacted in the manner set out above.

The invention also includes, as new compounds, the secondary aromatic-aliphatic amines which can be prepared by the reaction defined above, however prepared, i.e., when prepared by that reaction or by any other reaction. Such compounds will have one of the two formulas below, in which R, $R_1$, $R_2$, $R_3$, $R_4$, $R_5$, $R_6$ and $R_7$ have the significance set out above.

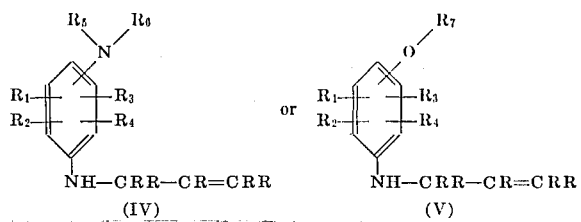

Specific new compounds encompassed by the invention include N,N-dimethyl-N'-(1-ethyl-2-methylprop-2-enyl)-p-phenylenediamine, N,N-dimethyl-N'-(1-isopropenylhexyl)-p-phenylenediamine, N,N-diethyl-N'-(1-ethyl-2-methylprop-2-enyl)-p-phenylenediamine, N-phenyl-N'-(1-isopropenylhexyl)-p-phenylenediamine.

Preferred aromatic nitroso compounds which may be used in the process of this invention are those which contain at least one hetero (non-carbon) atom joined to another carbon atom of the same aromatic ring in position para to the nitroso group. Such preferred compounds have the following general formulas:

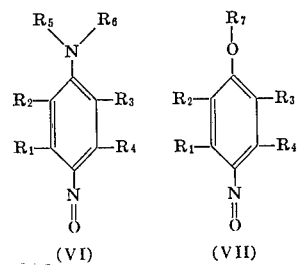

where $R_1$, $R_2$, $R_3$, $R_4$, $R_5$, $R_6$ and $R_7$ have the same meaning as defined above.

Specific examples of preferred aromatic nitroso compounds are:

| | |
|---|---|
| N,N-Dimethyl-p-nitrosoaniline | DMNA |
| N,N-Diethyl-p-nitrosoaniline | DENA |
| p-Nitrosodiphenylamine | NDPA |
| p-Nitrosophenol | NP |

Other suitable aromatic nitroso compounds include 6-nitrosothymol; p-nitrosophenyl ethyl ether; 2-methyl-4-nitrosophenol; 2,6-dimethyl-4-nitrosophenol; 2,6-diethyl-4-nitrosophenol; 2,6-diisopropyl-4-nitrosophenol; 3-methyl-4-nitrosophenol; and 3,5-dimethyl-4-nitrosophenol.

The olefin to be used in the process of this invention may be determined by economic considerations. Mention will be made of three preferred groups of olefin. In one group comprising the commercially available olefin hydrocarbons, the radicals R in the olefin

RRC = CR—CHRR are hydrogen atoms or saturated or unsaturated alkyl radicals containing from one to 20, particularly from one to six, carbon atoms. Specific examples are 2-methylpent-2-ene and 2-methyloct-2-ene. Another group comprises the naturally occurring unsaturated animal and vegetable fats and oils, for example, pilchard oil, rapeseed oil, palm oil, castor oil or olive oil and unsaturated derivatives thereof, and the unsaturated fatty acids, e.g. oleic acid, which may be obtained from them by hydrolysis. The third group comprises short-chain unsaturated hydrocarbon polymers, containing about one double bond per molecule, such as are obtained during the Friedel-Crafts polymerization of simple olefins, e.g., polybutene from isomeric butenes.

Any convenient olefin may be used according to the invention provided that there is a hydrogen atom attached to the carbon atom which is in the α-position to the carbon-carbon double bond. However, the rate of reaction of a specific olefin depends on its detailed structure. Thus, tri-(alkyl substituted) ethylenes generally react faster than di- or mono- (alkyl substituted) ethylenes.

The reaction of this invention is thought to take place via an α–β shift of the double bond in the olefin molecule. The overall course of the reaction may be represented generally as:

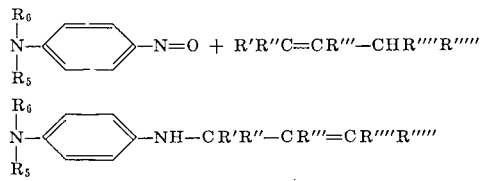

where R′, R″, R‴, R⁗ and R⁗′ are all within the above stated definition of R, the nomenclature being used to illustrate the double bond shift.

The reaction between the aromatic nitroso compound and the olefin is effected by heating the reactants together in the liquid phase. The olefin may constitute the liquid medium; but the aromatic nitroso compounds have only limited solubility in olefins, so a substantial excess of the olefin may have to be used. Alternatively, a non-polar organic solvent, such as, for example, xylene or cyclohexane, may be used; such non-polar solvents have little effect on the rate of reaction, compared to reaction performed in the absence of solvents, but may slightly increase the yield.

In order to further increase the yield and reduce by-product formation, compounds capable of acting as electron transfer reductants (for example, 2 moles of zinc dimethyldithiocarbamate per mole of nitroso compound) or as hydrogen atom donors (e.g. 1 mole of hydroquinone per mole of nitroso compound) may be added as co-agents to the reaction mixture either in the presence or absence of a non-polar solvent. Care must however be taken that the co-agent does not react with the aromatic nitroso compound. The effect of these co-agents does not appear to be to increase the rate of reaction, but to cut down the formation of other products in side reactions, thus increasing the yield.

Alternatively, again, polar organic compounds, for example, dimethyl sulphoxide, dimethyl formamide or isopropanol, may be used as solvents for the reaction. These polar solvents decrease the rate of reaction but lead to a higher final yield by minimizing side reactions.

The temperature to which the reactants are heated is not critical. Reaction between DMNA and 2-methylpent-2-ene in the absence of solvent was found to be complete after 9 days at 35°C.; at 100°C. substantial reaction had occurred within 15 minutes and the reaction was complete in 2½ hours. However, yield decreases with increasing temperature, and it is therefore preferable to use as low a temperature as possible consistent with an adequate reaction rate, for example from 60° to 80°C. in the absence of polar solvents. When polar solvents are used, higher temperatures are generally desirable, e.g. from 90° to 110°C., in order to make the reaction proceed fast enough, and higher temperatures of up to 140°C. or more may be employed.

In air, the reaction is complicated by extensive side-reactions, and the yield of the desired secondary aromatic-aliphatic amine may be low. It is therefore preferred to perform the reaction either under vacuum or an inert atmosphere, for example, nitrogen.

The formation of substituted p-phenylenediamines by the reaction of N,N-dimethyl-p-nitrosoaniline, or N,N-diethyl-p-nitrosoaniline or p-nitrosodiphenylamine with other olefins has been demonstrated by analysis of the products by thin-layer chromatography on silica gel, mild oxidation of the plates converting the p-phenylenediamines to the characteristically colored Wurster radicals. The olefins giving positive reactions were 2-methylpent-2-ene, 2-methyloct-2-ene, squalene, pent-3-ene, 2-methyl-oct-1-ene, 4-methylpent-2-ene, 1-methylcyclohex-1-ene, 2,3-methylbut-2-ene, hex-1-ene and hex-2-ene, all of which fulfil the requirements given for (III) above. Yields were estimated to be in the range 40 to 70 percent based on the original nitroso compound.

Although it is apparently unnecessary in view of the high antioxidant activity of the initial products, the unsaturated alkyl group in the secondary amine produced may be hydrogenated according to the invention to give the corresponding fully saturated compound.

The invention also envisages the use of these new secondary amines as inhibitors or retarders of oxidative degradation reactions such as occur in rubbers, fats, oils, cracked gasoline and petroleum.

The invention is illustrated by the following Examples.

EXAMPLE 1

N,N-Diethyl-N-(1-ethyl-2-methylprop-2-enyl)-p-phenylenediamine (VIII) was prepared

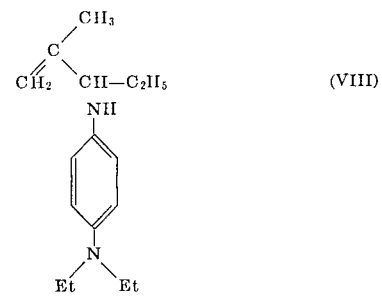

by heating 8.9 g. of N,N-diethyl-p-nitrosoaniline (DENA) with 16 g. of 2-methyl-pent-2-ene in xylene (25 mls.) under vacuum at 140°C. for 48 hours. Removal of the solvent gave 6g. of product, b.p. 96°/0.01 mm. (Found C, 78.0; H, 10.8 N, 11.5. $C_{16}H_{26}N_2$ requires C, 78.1; H, 10.6; N, 11.3%). Its identity was confirmed as (VIII) by both infra-red and nuclear magnetic resonance spectroscopy.

EXAMPLE 2

N,N-Dimethyl-p-nitrosoaniline (DMNA) (2.0 g.) and 2-methyl-pent-2-ene (20 mls.) were dissolved in dimethylformamide (80 mls.), the solution sealed in a glass ampoule under vacuum, and heated in an oil bath at 100°C. for 16 hours. The solvent and excess of olefin were removed by distillation at water-pump pressure, and the residue distilled under high vacuum. The dark red oil b.p. 120°C./0.005 mm. weighed 1.32 g. (45 percent of theoretical yield), and was identified by its ultraviolet, infra-red, and nuclear magnetic resonance spectra and elemental analysis as N,N-dimethyl-N'-(1-ethyl-2-methylprop-2-enyl)-p-phenylenediamine (IX) as follows $uv$ : $\lambda_{max} = 261.5$ m$\mu$, log $\epsilon = 4.19 \pm 0.01$ $ir$ : bands at 812 cm$^{-1}$ (p-disubstituted benzene), 895 cm$^{-1}$ ($H_2C = CR_2$), and 948 cm$^{-1}$ (C—N—C symmetrical stretch)

$nmr$: peaks at 6.49 $\rho$ ( = C—CH—N—, triplet, splitting 6.5 cps) and 6.92 $\tau$ (NH), the integral of each corresponding to 1 proton nitrogen content 12.2 percent, $C_{14}H_{22}N_2$ requires N, 12.8%. Gas-liquid chromatographic analysis of the product in comparison with p-phenylenediamines of known structures was also consistent with the proposed structure (IX). The corresponding N,N-diethyl compound (VIII) was also prepared, in 45 percent yield, by the method of this example, using DENA in place of DMNA.

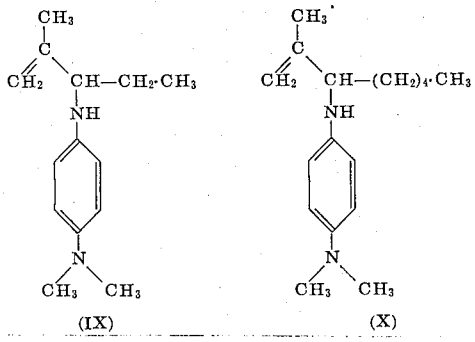

(IX)  (X)

EXAMPLE 3

N,N-Dimethyl-p-nitrosoaniline (DMNA) (5.0 g.), 2-methyloct-2-ene (10 g.) and dimethylformamide (50 mls.) were heated under an atmosphere of nitrogen for 4 hours at 100°–110°C., when thin layer chromatographic analysis of the mixture indicated complete consumption of the nitroso compound. The solvent and excess of olefin were distilled off at water-pump pressure, and the residue distilled under high vacuum to give 3.5 g. (40 percent of theory) of a red oil, b.p. 110°/0.001 mm. This was shown by analysis to be N,N-dimethyl-N'-(1-isopropenylhexyl) p-phenylendiamine (X) and had $uv$ absorption $\lambda_{max} = 262$ m$\mu$; log$\epsilon = 4.20 \pm 0.01$, infrared absorption bands at 812 cm$^{-1}$ (p-disubstituted benzene), 893 cm$^{-1}$. ($H_2C = CR_2$) and 948 cm$^{-1}$ (C—N—C symmetrical stretch) and proton nmr peaks at 6.42 $\tau$ ( = C—CH—N, triplet, splitting 5.5 cps) and 6.85$\tau$ (NH), the integral of each corresponding to one proton.

Found: N 11.5%.$C_{17}H_{28}N_2$ requires N, 10.8%. Gas-liquid chromatographic retention times were consistent with the proposed structure.

EXAMPLE 4 p-Nitrosophenol (NP) (0.5 g.) and 2-methylpent-2-ene (6.8 g.) were dissolved in dimethylformamide (30 g.), sealed in vacuo and heated at 120°C. for an hour. Evaporation of the excess of olefin gave a semi-solid residue which was extracted with chloroform, and the residue obtained on evaporation of the chloroform was then extracted with light petroleum (b.p. 30°–40°C.). Preparative-scale thin layer chromatography yielded a light brown oil (0.05 g.) which was identified by ultra violet, infra-red and nuclear magnetic resonance spectroscopy as the expected 1-hydroxy-4-(1-ethyl-2-methylprop-2-enylamino)-benzene (XI) as follows $uv$ : $\lambda_{max} = 246$ and 318 m$\mu$, the bathochromic shift of 10 m$\mu$ compared with p-aminophenol ($\lambda_{max} = 236$ and 306 m$\mu$) being consistent with the secondary amino structure $ir$ : bands at 820 cm$^{-1}$ (p-substituted benzene), 895 cm$^{-1}$ ($CH_2 = CR_2$), 3425 cm$^{-1}$ ($CCl_4$ sol$^n$; R—NH—Ar) and 3610 cm$^{-1}$ ($CCl_4$ sol$^n$, Ar—OH)

$nmr$ : peaks at 6.3$\tau$ ( = C—CH—N and = C—CH—O), 5.83$\tau$ (N—H and O—H) and 5.09$\tau$ ($CH_2$ = ), the line integral of each corresponding to two protons.

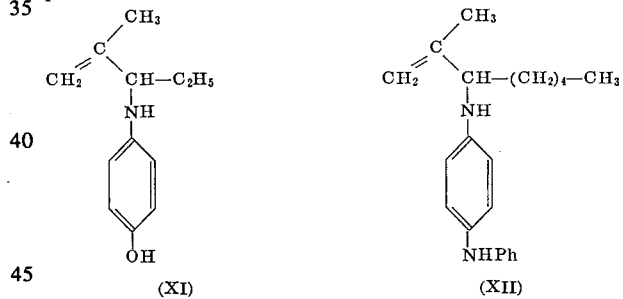

(XI)  (XII)

EXAMPLE 5 p-Nitroso-diphenylamine (NDPA) (10 g.), 2-methyloct-2-ene (40 g.), zinc dimethyl-dithiocarbamate (25 g.) and dimethylformamide (90 ml.s) were heated for 5 hours at 140°C. under nitrogen, after which time no NDPA remained unreacted. The product was treated with water, and the organic layer separated off. The aqueous layer was removed from the solid precipitate, and washed with light petroleum (b.p. 30°–40C.). The organic layer and petrol washings were combined and washed with 2N hydrochloric acid, the acid layer neutralized with dilute ammonia and the product extracted with petrol. The black residue obtained after evaporation of the petrol had ultraviolet and infra-red spectra consistent with the proposed structure (XII), the purity being assessed by thin-layer chromatography as 75 percent. The yield was 60 percent of theory.

The antioxidant properties of the -phenylenediamines VIII, IX, X and XII were evaluated in the oxygen absorption of a gum natural rubber vulcanizate using the formulation:

| | |
|---|---|
| Natural rubber (Heveacrumb SMR5L) | 100 parts by weight |
| Zinc oxide | 5 |
| Stearic acid | 2 |
| N-Cyclohexylbenzothiazole-2-sulphenamide (CBS) | 0.5 |
| Sulphur | 2.5 |
| Cure time | 40'/140°C. |

The oxygen absorption of samples cut from 10×10×0.3 cm. vulcanized sheets was measured at 100°C. The results are compared in Table 1 with those given by three commercially available p-phenylenediamine antioxidants.

TABLE 1

Antioxidant activity of p-phenylenediamine (1 pphr)

| Example | p-Phenylenediamine | Hours to 1% oxygen absorption |
|---|---|---|
| | None | 26 |
| | N-Isopropyl-N'-phenyl * | 60 |
| | N-(1,3-Dimethylbutyl)-N'-phenyl ** | 51 |
| | N,N'-Di-(1,4-dimethylpentyl) *** | 40 |
| 2 | N,N-Dimethyl-N'-(1-ethyl-2-methyl-prop-2-enyl) | 52 |
| 3 | N,N-Dimethyl-N'(1-isopropenyl-hexyl) | 58 |
| 1,2 | N,N-Diethyl-N'(1-ethyl-2-methyl-prop-2-enyl) | 52 |
| 5 | N-Phenyl-N' (isopropenylhexyl) + | 45 |

* Commercially available as Nonex ZA
** Commercially available as Santoflex 13
*** Commercially available as Santoflex 77
+ 75% pure The Table shows that the novel p-phenylenediamine antioxidants are equally as effective as the best available saturated p-phenylenediamines.

The p-phenylenediamine (XII) prepared as described in Example 5 was evaluated for antiozonant activity in the gum vulcanizate formulation given above by testing in the ozone chamber at an ozone concentration of 25 pphm and a temperature of 30°C. The results are given below.

Antiozonant activity of N-phenyl-N'-(iso-propenyl hexyl)-p-phenylenediamine

| Antiozonant | Level % | Static critical strain % | Dynamic 0-20% strain at 300 cpm hours to first crack |
|---|---|---|---|
| None | — | 7 | 4 |
| N-Phenyl-N'-(iso-prophenylhexyl)-p-phenylenediamine | 4 | 20 | 30 |

The results show a significant antiozonant activity for the novel p-phenylenediamine.

In Table 2 below, there are given various further examples which serve to show how the reaction conditions affect the yield. In all cases the time of heating is that required to consume all the aromatic nitroso compound. The yields of the p-phenylenediamines were measured by gas-liquid chromatographic analysis of the reaction products. Where a solvent is used, the concentration of the nitroso compound in the solvent is 5 percent. Where no solvent is present, a 20-fold molar excess of the olefin is used. Co-agents when used, are used at a concentration of 2.3 moles per mole of nitroso compound.

TABLE 2

| Example | Nitroso Compound | Olefin | Solvent | Co-Agent |
|---|---|---|---|---|
| 6 | DMNA | MP | None | None |
| 7 | DMNA | MP | None | None |
| 8 | DMNA | MP | None | None |
| 9 | NDPA | MP | None | None |
| 10 | DMNA | MP | None | ZDC |
| 11 | NDPA | MP | None | TBTU |
| 12 | DMNA | MP | None | PPD |
| 13 | DMNA | MP | Cyclohexane | None |
| 14 | DMNA | MP | Xylene | None |
| 15 | DMNA | MP | DMSO | None |
| 16 | DMNA | MP | DMF | None |
| 17 | DMNA | MP | Isopropanol | None |
| 18 | DMNA | MO | DMF | None |
| 19 | DMNA | MO | DMF | None |

| Example | Atmosphere | Heating Temp. | Time | Yield % of theory |
|---|---|---|---|---|
| 6 | Vacuum | 35°C. | 9 days | 38 |
| 7 | Vacuum | 65°C. | 24 hours | 36 |
| 8 | Vacuum | 100°C. | 2.5 hours | 25 |
| 9 | Vacuum | 100°C. | 2.5 hours | 28 |
| 10 | Vacuum | 100°C. | 2.5 hours | 40 |
| 11 | Vacuum | 100°C. | 2.5 hours | 43 |
| 12 | Vacuum | 100°C. | 2.5 hours | 35 |
| 13 | Vacuum | 100°C. | 2.5 hours | 32 |
| 14 | Vacuum | 100°C. | 2.5 hours | 34 |
| 15 | Vacuum | 100°C. | 16 hours | 52 |
| 16 | Vacuum | 100°C. | 16 hours | 68 |
| 17 | Vacuum | 100°C. | 16 hours | 57 |
| 18 | Vacuum | 100°C. | 16 hours | 50 |
| 19 | Nitrogen | 100°C. | 16 hours | 40–50 |

MP is 2-methylpent-2-ene
MO is 2-methyloct-2-ene
DMSO is dimethyl sulphoxide
DMF is dimethylformamide
ZDC is zinc dimethyldithiocarbamate
TBTU is tributyl thiourea
PPD is N-(1,3-dimethylbutyl)-N'-phenyl-p-phenylenediamine.

The following Examples relate to products obtained by reacting aromatic nitroso compounds with higher molecular weight olefins, particularly naturally occurring fats and oils. By contrast with most conventional antioxidants, these products have the virtue of not being readily or accidentally removed from the media into which they have been incorporated as protection against oxidative degradation. Articles of the medium concerned, for example, rubber hoses, hot-water bottles and motor vehicle tipes, can be used in contact with water or other solvents with less risk of the antioxidant being leached out.

The most efficient antioxidants, the substituted p-phenylenediamines, discolor badly during ageing and exposure to light and they are normally used in dark-colored articles only. Migration of the antioxidant is liable to cause staining of neighboring light-colored articles. The antioxidants described in the following Examples have the advantage, owing to the comparatively large size of their molecules, of a much reduced tendency to migration.

EXAMPLE 20

NDPA (2 g.) and a light polybutene oil obtained by the polymerization of mixed butenes (average m.w. 260, 50 mls.) were heated under nitrogen at 100°C. till all the NDPA had reacted (5 hours). The product was distilled under high vacuum to give a dark red oil, b.p. ca 200°/0.002 mm, the uv spectrum being consistent with the formulation as N-phenyl-N'-(polybutenyl)-p-phenylenediamine.

EXAMPLE 21

DENA (2 g.) and the polybutene used in the previous example (50 mls.) were similarly heated under nitrogen at 100°C. to complete reaction. A sample of the crude reaction product was tested for antioxidant activity. The bulk was treated with light petroleum (b.p. 30°–40°C.), and washed with water (3×50 mls.). The petroleum solution was then washed with 2N hydrochloric acid (3 × 100 mls.), some difficulty being experienced due to the formation of an emulsion. The acid washings were combined, neutralized by the addition of dilute ammonia solution, and the product extracted with light petroleum (b.p. 30°–40°C., 3 × 75 mls.). The residue obtained after evaporation of the petrol after drying gave a dark oil whose ultraviolet spectrum was consistent with its formulation as N,N-diethyl-N'-(polybutenyl)-p-phenylenediamine.

EXAMPLE 22

NDPA (2 g.), palm oil (10 g.) and dimethylformamide (50 mls.) were heated under nitrogen at 100°C. until no NDPA was detectable by thin-layer chromatography. The solvent was distilled off at reduced pressure and the modified oil used without further purification.

EXAMPLE 23

Fish oil represents a cheap source of highly unsaturated oil. Refined pilchard oil (40 g.) was heated under nitrogen with NDPA (10 g.) or DENA (10 g.) at 100°C. for 5 hours with stirring. The resulting adducts were used without further purification.

EXAMPLE 24

Further examples with castor and tung oils were obtained as follows. A mixture of the oil (10 g.) and p-nitroso-diphenylamine (1 g.) was heated at 125°C. for 2 hours in air. The product was tested as an antioxidant without further purification, and it should be noted that it could contain only 10 percent by weight of an active p-phenylenediamine antioxidant.

Times for 1 percent w/w absorption of oxygen at 125°C. by squalene containing the products were found to be:

| Oil treated | Amount added to squalene | Minutes to 1% $O_2$ absorption |
|---|---|---|
| No addition | — | 6 |
| Castor oil | 6.3% | 2280 |
| Tung oil | 4.3% | 1140 |

The antioxidant activity of the products described in Examples 20–24 were evaluated in the NR gum vulcanizate given after Example 5 above by measurement of the oxygen absorption of the vulcanizates at 100°C. before and after an extraction process consisting of immersing the sheet in cold running tap water for seven days. The results are given in Table 3.

TABLE 3

| Additive | Level | Hours to 1% $O_2$ absorption | |
|---|---|---|---|
| Substituted -p-phenylene-diamine | pphr | Unextracted | extracted |
| None | — | 26 | 18 |
| Nonox ZA | 1 | 60 | 13 |
| Santoflex 13 | 1 | 51 | 37 |
| Santoflex 77 | 1 | 40 | 33 |
| N-Phenyl-N'-(polybutenyl) | 2 | 58 | 40 |
| N,N-Diethyl-N'-(polybutenyl). (crude) | 5 | 35 | 29 |
| N,N-Diethyl-N'-(polybutenyl). (purified) | 2 | 43 | 39 |
| NDPA modified palm oil | 5 | 43 | 31 |
| Pilchard oil | 3 | 16 | — |
| NDPA modified pilchard oil | 3 | 32 | — |
| DENA modified pilchard oil | 3 | 28 | — |
| NDPA modified castor oil | 3 | 29.5 | — |
| NDPA modified tung oil | 3 | 32 | — |

The first of these three compounds is almost as effective as Nonox ZA before extraction, and slightly superior to Santoflex B after extraction. The performance of the treated palm oil, which can only contain at the most 20 percent of p-phenylenediamine species, is noteworthy. Furthermore the gum vulcanizate containing the N-phenyl-N'-poly-butenyl-p-phenylenediamine was much lighter in color than usual with this type of antioxidant, approaching that of a control with no antioxidant. The last five products listed were not tested after water extraction.

EXAMPLE 25

A repeat preparation of the modified palm oil was carried out by heating NDPA (20 g.), palm oil (50 g.) and hydroquinone at 100°C. under nitrogen with stirring for 6 hours. The product gave a similar antioxidant activity in the gum vulcanizate to that of Example 22.

A black filled vulcanizate was prepared using the base compound: natural rubber (ribbed smoked sheet 1), 100; ZnO, 5; stearic acid, 2; high abrasion furnace black, 45; processing aid (Dutrex R), 5; CBS, 0.5; sulphur, 2.5. Test pieces were cured 40'/140°. The initial physical properties of a control vulcanizate and those prepared with 6 pphr of the crude product were very similar; 12 pphr of adduct giving some reduction in properties:

| | Palm oil adduct pphr | | |
|---|---|---|---|
| Property | 0 | 6 | 12 |
| Tensile strength (kg/cm²) | 288 | 280 | 256 |
| Elongation at break (%) | 490 | 560 | 565 |
| Modulus at 100% extension (kg/cm²) | 25.5 | 20.5 | 18 |
| Modulus at 300% extension (kg/cm²) | 75 | 58 | 48 |
| Modulus at 300% extension (kg/cm²) | 144 | 114 | 95 |

The vulcanizates were retested after air oven ageing at 100°C. for various times, the retention of physical properties of the protected vulcanizates being higher than that of the control.

Ageing of a black vulcanizate

| Treated palm oil, pphr | % Retention of property | | | | | |
|---|---|---|---|---|---|---|
| | 1 day/100°C. | | | 3 days/100°C. | | |
| | T.S. | EB | $M_{100}$ | T.S. | EB | $M_{100}$ |
| 0 | 61 | 76 | 116 | 19 | 45 | 71 |
| 6 | 81 | 80 | 129 | 26 | 42 | 115 |
| 12 | 86 | 84 | 130 | 33 | 48 | 122 |

EXAMPLE 26

A carboxylic acid is necessary in the formulation of a rubber vulcanizate to act as an activator of the curing system. Commercially stearic acid is normally used. By reacting the unsaturated analogue, oleic acid, with a nitroso compound it should be possible to produce a combined activator/antioxidant.

NDPA (10 g.) was heated with oleic acid (50 g.) in dimethylformamide under nitrogen at 100°C. for 5 hours. The solvent was distilled off under vacuum and the modified acid used as a cure activator and antioxidant in the gum vulcanizate described above. Its activating properties were almost identical to those shown by stearic acid, and some antioxidant activity was also observed.

EXAMPLE 27

Factice is a material used as an additive in certain rubber vulcanizates for the purpose of aiding processing and extrusion characteristics, and is prepared by stirring rapeseed oil with about 25 parts per hundred of sulphur, equally together with an organic accelerator at a temperature of 160°C. until the mixture forms a gel. Refined rapeseed oil (100g), sulphur (25g), diethanolamine (5g) and NDPA (10g) were heated with stirring at 160°C., when gelation occurred after 65 minutes. A similar preparation without the NDPA gave a similar gelation time, the method of preparation being taken from British Specification No. 588,353.

Both factices were tested in the black filled vulcanizate whose composition is given in Example 25. Test pieces were cured at a cure time of 40 minutes at 140°C.

Samples from 10 × 10 × 0.3 cm sheets were tested by measuring the oxygen absorption at 100°C. before and after extraction with methanol/acetone/chloroform azeotrope or water.

| | Hours to 1% oxygen absorption | | |
|---|---|---|---|
| | Unextracted | Azeotrope extracted | water extracted |
| Factice | 20 | 8 | 14 |
| NDPA-treated factice | 29 | 16 | 20 |

The results indicate a retention of the antioxidant activity after both extraction processes.

We claim:
1. A process for preparing a secondary amine which comprises reacting
   a. and aromatic nitroso compound having the formula:

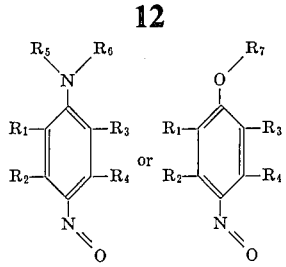

where $R_1$, $R_2$, $R_3$ and $R_4$ may be the same or different and each represents a hydrogen atom or a lower alkyl group, and $R_5$, $R_6$ and $R_7$ may be the same or different and each represents a hydrogen atom or an alkyl group or phenyl group, and with
   b. an olefinically unsaturated compound having at least one hydrogen atom attached to a carbon atom which is in the α-position to the double bond, selected from the group consisting of
      i. a hydrocarbon of the formula RRC = CR—CHRR, wherein R is hydrogen or a saturated or unsaturated hydrocarbon group containing from one to 20 carbon atoms;
      ii. naturally occuring unsaturated animal and vegetable fats and oils or the carboxylic acids obtained from them by hydrolysis;
      iii. short-chain unsaturated hydrocarbon polymers containing about one double bond per molecule; the molar proportion of reactant (b) present being at least about 2.5 times the molar proportion of reactant (a) present, said reaction being performed by heating the reactants together at a temperature of from 35° to 125°C in the absence of an organic solvent or at a temperature of from 35° to 140°C in the presence of an inert organic solvent.

2. A process as claimed in claim 1, wherein the radicals R in the olefin are hydrogen atoms or saturated or unsaturated alkyl groups containing from one to six carbon atoms.

3. A process as claimed in claim 1, wherein the reactants are heated together for a time between a quarter of an hour and 9 days under vacuum or an inert atmosphere.

4. A process as claimed in claim 1, wherein the reaction is performed by heating the reactants in the absence of a solvent at a temperature from 60° to 100°C.

5. A process according to claim 1 wherein the molar proportion of reactant (b) is at least about 4 times the molar proportion of reactant (a).

6. A process according to claim 1 wherein the molar proportion of reactant (b) is at least about 4 times the molar proportion of reactant (a).

7. A process as claimed in claim 2, wherein the olefinically unsaturated compound is 2-methylpent-2-ene or 2-methyloct-2-ene.

8. A process as claimed in claim 2, wherein the olefinically unsaturated compound is pilchard oil, rapeseed oil, palm oil, castor oil or the carboxylic acids derived therefrom by hydrolysis.

9. A process as claimed in claim 8, wherein the olefinically unsaturated compound is oleic acid.

10. A process as claimed in claim 1, wherein the olefinically unsaturated compound is obtained by Friedel-Crafts polymerization of butene.

* * * * *